Feb. 5, 1957 T. M. ELLIOTT 2,780,686
INDICATING DEVICE
Filed Aug. 4, 1955
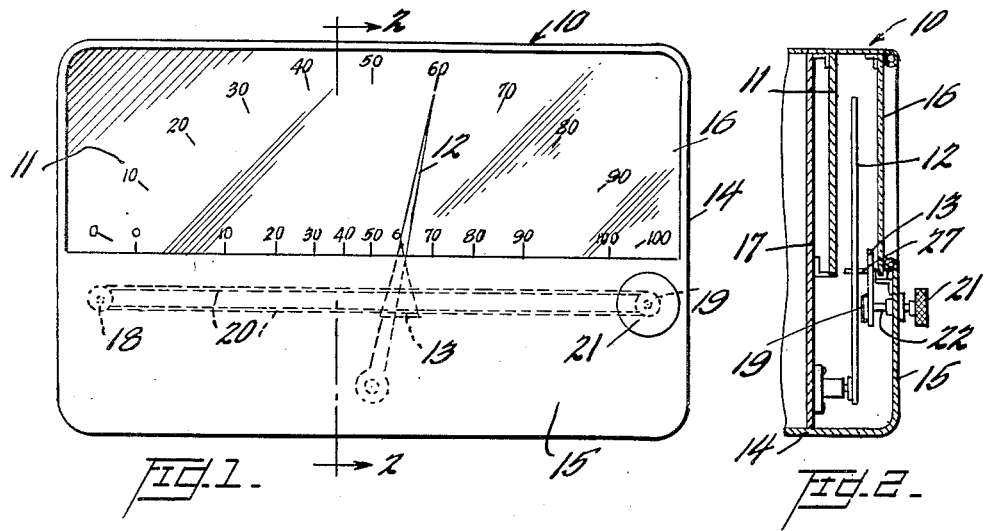
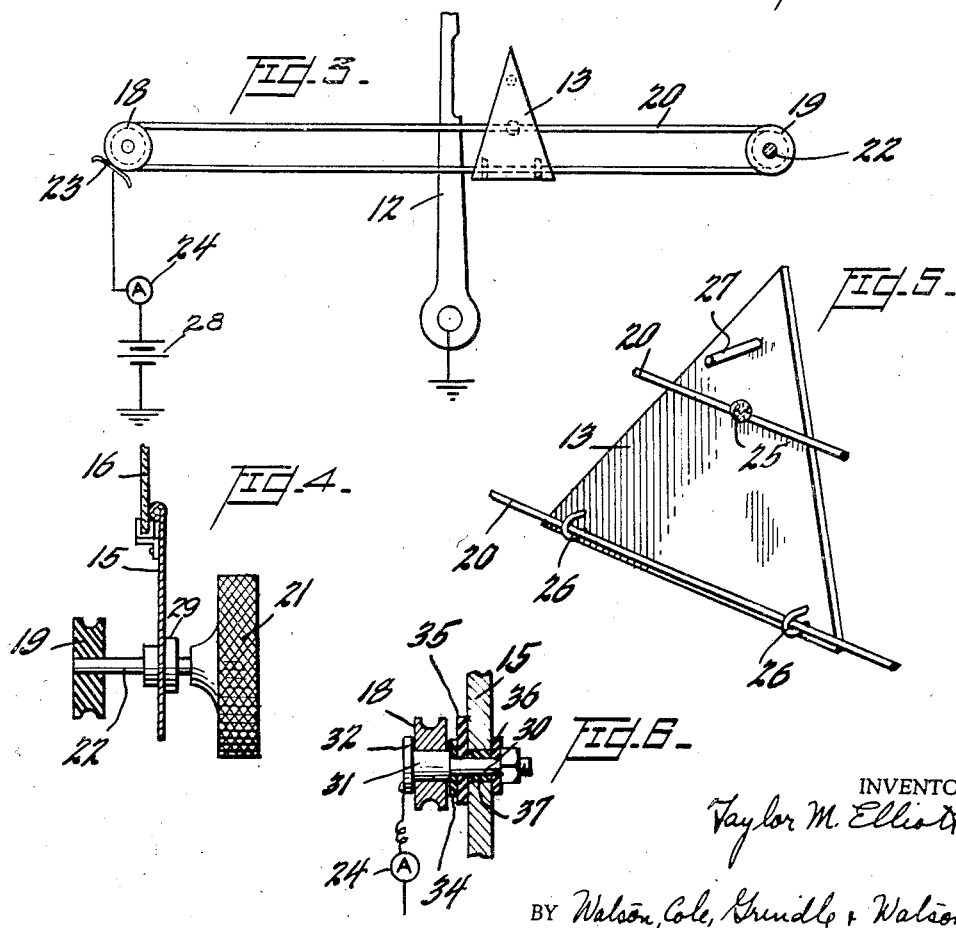
INVENTOR,
Taylor M. Elliott.
BY Watson, Cole, Grindle & Watson,
ATTORNEYS.

United States Patent Office 2,780,686
Patented Feb. 5, 1957

2,780,686
INDICATING DEVICE
Taylor M. Elliott, Richmond, Va.
Application August 4, 1955, Serial No. 526,523
8 Claims. (Cl. 200—56)

This invention relates to improved apparatus for rendering a signal in the event that a measured quantity equals or exceeds a selected value, and in particular to improved apparatus for actuating an alarm or other indicator device in response to a vehicle speed equal to or in excess of a selected value.

As a result of the modern improvements in automobiles, vehicle speeds in excess of the prescribed limits for streets and highways are readily attainable. In many instances the operators of these vehicles unknowingly exceed the established limits through inadvertency, which may in part be caused by the relatively smooth functioning of recent models and also a natural tendency to increase vehicle speed during periods of sustained driving. It may be readily appreciated that excessive speeds are not conducive to safe driving, and with the recent innovation of radar controlled streets and highways the drivers of these vehicles also subject themselves to police action for momentarily excessive speeds which would otherwise go unnoticed.

Accordingly, a principal object of this invention is to provide improved apparatus which will enable the driver of a vehicle to ascertain readily and with a minimum of distraction that he is equaling or exceeding a selected speed.

Another object of this invention is to improve the visual appearance and the readability of speedometer dials incorporating a speed selector scale in association with the usual speed scale.

Another object of this invention is to provide speed selector adaptations suitable for use with conventional speedometers, including modern wide dial speedometers, and requiring a minimum of adaptive modification of the speedometer and its components.

Another object of this invention is to provide a speedometer alarm attachment which is readily adjustable to any selected speed, reliable in operation, and which may be easily repaired in the event of defective operation.

A preferred embodiment of this invention contemplates a conventional speedometer which is modified to receive the speed selector attachment of this invention. In particular, a linear speed selector scale is imprinted on the face of the speed indicator dial in such a manner that the speedometer pointer passes over the selector scale at a marked numerical value which corresponds with the pointer indicator speed. A selector pointer, associated with the linear selector scale, is linearly moved by the manual rotary operation of an exposed knob which drives a concealed cable. The knob enables the operator to position the selector pointer at any desired value of speed at which an alarm or the like is to be actuated in the event the vehicle is driven at a value equal to or in excess of the selected speed.

The alarm is electrically actuated by a closed circuit which is established when the speedometer pointer touches a contact projecting from the selector pointer. A completed electrical circuit is thereby established through the metallic speedometer pointer to ground, a grounded battery, the alarm device, and the metallic cable back to the speedometer pointer.

While devices employing two contacting pointers have been disclosed in the prior art to actuate a speedometer alarm, the specific construction shown herein which features a cable-driven selector pointer movable over a linear scale associated with a speed scale has not been contemplated. The advantages of this invention over the prior art structures accrue to a large extent as a result of the foregoing structural innovations.

In order that all of the features for attaining the objects of this invention may be readily understood, detailed reference is made herein to the accompanying drawings wherein:

Figure 1 is a simplified plan view of a conventional speedometer modified to incorporate the speed selector of this invention, Figure 2 is a sectional view taken along line 2—2 of Figure 1 and showing in sectional detail the speedometer construction of this invention, Figure 3 is a simplified view showing the alarm actuating circuit which is established by the selector attachment herein, Figure 4 is a view showing the manner in which the selector knob is coupled to the speedometer casing, Figure 5 is a perspective view showing in detail the manner in which the selector cable is attached to the selector pointer, and Figure 6 is a view showing an alternative pulley arrangement for supporting the selector cable.

Referring now to the drawings and in particular to Figure 1, speedometer 10, which is modified in accordance with the speed selector features of this invention, is positioned at a vehicle dashboard in the conventional manner. The modifications to the speedometer structure required to practice the present invention do not necessitate a different positioning of the speedometer with respect to the associated dashboard instrumentation than that which would otherwise be desirable.

Speedometer 10 includes dial plate 11 which is formed, for example, with a conventional numerical circular scale upon which vehicle speed is indicated by a metallic speedometer pointer 12. A numerical linear scale is positioned at the lowermost edge portion of dial plate 11. The particular positioning of the numerical markings of this scale are determined so that the rightmost edge of speedometer pointer 12 will touch the metallic contact finger 27 (Figure 5) projecting rearwardly from a metallic selector pointer 13.

The internal speedometer structure is enclosed within a protective housing 14, which may in some instances be integral with the automobile dashboard, and formed in whole or in part from a suitable metal. This housing includes a front face portion 15 which is fabricated of metal but which may in some circumstances be constructed of opaque or translucent glass so that the cable mechanism and other component parts shown in broken line in Figure 1 cannot be seen by the operator. Transparent glass plate 16 is coupled to protective housing 14 by conventional attachment means so that the dial plate 11 and the upper terminal portions of speedometer and selector pointers 12 and 13 are readily visible to the vehicle operator. Dial plate 11 is supported in part by a backing plate member 17 which extends from the upper and lower edge wall portions of the speedometer housing, and speedometer pointer 12 is pivotally mounted with respect to backing plate 17 by structure which is conventional in the art. Speedometer pointer 12 is elongated and fabricated with a relatively bright finish, and selector pointer 13 is wide and fabricated with a relatively dark finish. This selection avoids confusion of hands.

Cable pulleys 18 and 19 are rotatably supported with respect to the front face portion 15 of housing 14. Pulley 18 carries metallic cable 20, and pulley 19 serves to drive the cable and the attached selector pointer 13 in response to a manual rotating force applied to knob 21. As is best shown in Figure 4, pulley 19 is rigidly coupled to knob 21 by means of shaft 22. Shaft 22 passes through bushing 29 positioned on front face portion 15 and therefore the shaft is free to rotate in response to the driving force applied to knob 21. Pulley 19 is fabricated of an electric insulating material to prevent shorting cable 20 to ground.

Other arrangements for preventing the shorting of cable 20 to ground are, of course, possible, such as, for example, the fabrication of shaft 22 or bushing 29 of electrical insulating material. Pulley 18 is fabricated of metal so that brush 23 can establish an electrical connection to selector pointer 13 from alarm 24. Pulley 18 must be suitably supported so that it will not be shorted to the environmental structure.

As is best shown in Figure 5, selector pointer 13 is coupled to cable 20 by spot welding the upper cable leg at weld point 25 and loosely passing the lower cable leg through U-bolts 26. This coupling arrangement of selector pointer 13 to cable 20 enables the pointer to move linearly in response to the movement of the cable 20.

A metallic contact finger 27 is attached to the uppermost portion of the rear face of selector pointer 13. In a preferred arrangement, the contact finger 27 is fabricated of spring metal so that speedometer pointer 12 can be driven past contact finger 27 thereby avoiding the application of harmful restraining forces to the speedometer cable and the speedometer pointer. It will be understood, however, that an initial electrical contact will nonetheless be established between the speedometer pointer 12 and contact finger 27, this contact closure being sufficient to actuate the alarm momentarily.

As is best shown in Figure 3, contact finger 27 and speedometer pointer 12 cooperate to form a normally-open electrical switch in an energizing circuit for alarm 24. This switch is open until such time as the speedometer pointer is driven into contact with contact finger 27. With this occurrence, current flow from battery 28 through alarm 24, brush 23, pulley 18, cable 20, selector pointer 13, and speedometer pointer 12 back to battery 28 through ground energizes the alarm thereby rendering a signal indicative of speed equal to or in excess of the selected speed.

An alternative arrangement for supporting pulley 18 and for establishing an electrical connection therethrough to cable 20 is shown in Figure 6. In this instance pulley 20 is rotatably supported on a fixed shaft 30 which is formed with a head 31. Electrical connection from alarm 24 to pulley 18 is established through stop plate 32 which is fixed to the left end of head 31. Shaft 30 is insulated from metallic housing 15 by means of washers 34, 35 and 36 and sleeve 37 which are fabricated by insulating material, thereby preventing an unwanted shorting of pulley 18 to housing 15.

In order to avoid excessive sparking, in certain installations it may be desirable to energize alarm 24 from a relatively low voltage source. In these instances it is desirable to employ a voltage reducer such as a divider to apply less than the total battery voltage to the circuitry. In the event an alternating-current energizing source is to be employed in lieu of a battery, a step-down transformer can be used to energize the alarm.

It is to be understood that the above-described arrangement is illustrative of the application of the principles of this invention. Numerous other arrangements may be devised by those skilled in the art without departing from the scope of this invention.

Having thus described the invention, what is claimed as new and desired to be secured by Letters Patent is:

1. In a speedometer including a pivoted speedometer pointer movable over a speed indicator dial and housed within a protective casing including a transparent plate rendering at least a portion of said dial and pointer visible, the improvement for actuating a speed indicator alarm comprising a pair of pulleys supported by said casing immediately below said transparent plate, a cable carried by said pulleys and forming a closed loop, a triangular speed selector pointer fixedly coupled to one leg of said cable and loosely coupled to the other leg of said cable, said selector pointer overlying at least in part the portion of said dial which is exposed, a linear speed selector scale formed upon said dial and graduating the path of movement of said selector pointer into speed readings, a contact finger fixedly coupled to said selector pointer and projecting rearwardly into the path of said speedometer pointer whereby a closed electrical circuit for actuating said alarm may be established, and a knob positioned in front of said speedometer and coupled to said cable whereby said selector pointer may be manually positioned at a selected speed at which the alarm is to be actuated.

2. In a speedometer including a pivoted speedometer pointer movable over a speed indicator dial and housed within a protective casing including a transparent plate rendering at least a portion of said dial and pointer visible, the improvement for actuating a speed indicator alarm comprising a pair of pulleys supported by said casing immediately below said transparent plate, a cable carried by said pulleys, a speed selector pointer coupled to said cable and linearly movable therewith, said selector pointer overlying at least in part of the portion of said dial which is exposed, a linear speed selector scale formed upon said dial and graduating the path of movement of said selector pointer into calibrated speed readings, a contact finger fixedly coupled to said selector pointer and projecting rearwardly into the path of said speedometer pointer whereby a closed electrical circuit for actuating said alarm may be established, and a knob positioned in front of said speedometer and coupled to said cable whereby said selector pointer may be manually positioned at a selected speed at which the alarm is to be actuated.

3. In a speedometer including a pivoted speedometer pointer movable over a speed indicator dial and housed within a protective casing including a transparent plate rendering at least a portion of said dial and pointer visible, the improvement for actuating a speed indicator alarm comprising a pair of pulleys supported by said casing, a cable carried by said pulleys, a speed selector pointer coupled to said cable and linearly movable therewith, said selector pointer overlying at least in part a portion of said dial, a linear speed selector scale formed upon said dial and graduating the path of movement of said selector pointer into speed readings, a contact finger fixedly coupled to said selector pointer and projecting into the path of said speedometer pointer whereby a closed electrical circuit for actuating said alarm may be established, and a knob positioned in front of said speedometer and coupled to said cable whereby said selector pointer may be manually positioned at a selected speed at which the alarm is to be actuated.

4. In a speedometer including a speedometer pointer movable over a speed indicator dial, the improvement for actuating a speed indicator alarm comprising a plurality of spaced pulleys, a taut cable carried by said pulleys, a speed selector pointer coupled to said cable and linearly movable therewith, said selector pointer overlying at least in part a portion of said speed indicator dial, a linear speed selector scale formed upon said dial and graduating the path of movement of said selector pointer into speed readings, a contact carried by said selector pointer and projecting into the path of said speedometer pointer whereby a closed electrical circuit for actuating said alarm may be established, and a knob positioned in front of said speedometer and coupled to said cable whereby said selector pointer may be manually positioned at a selected speed at which the alarm is to be actuated.

5. In an indicator including a pivoted pointer movable over an indicator dial and housed within a protective casing including a transparent plate rendering at least a portion of said dial and pointer visible, the improvement for actuating an indicator alarm comprising a pair of pulleys supported by said casing immediately below said transparent plate, a cable carried by said pulleys, selector pointer coupled to said cable and linearly movable therewith, said selector pointer overlying at least in part the portion of said dial which is exposed, a linear selector scale formed upon said dial and graduating the path of movement of said selector pointer, a contact finger fixedly coupled to said selector pointer and projecting rearwardly into the path of said pivoted pointer whereby a closed electrical circuit for actuating said alarm may be established, and a knob positioned in front of said indicator and coupled to said cable whereby said selector pointer may be manually positioned at a selected value at which the alarm is to be actuated.

6. In an indicator including a pointer movable over a graduated indicator dial, the improvement for actuating an indicator alarm comprising a plurality of spaced pulleys, a cable carried by said pulleys, a selector pointer coupled to said cable and linearly movable therewith, said selector pointer overlying at least in part a portion of said dial, a linear selector scale graduating the path of movement of said selector pointer, a contact carried by said selector pointer and projecting into the path of said first pointer whereby a closed electrical circuit for actuating said alarm may be established, and a knob coupled to said cable whereby said selector pointer may be manually positioned at a selected value at which the alarm is to be actuated.

7. In an indicator including a pointer movable over a graduated indicator dial, the improvement for actuating an indicator alarm comprising a plurality of spaced pulleys, a cable formed into a closed loop carried by said pulleys, a selector pointer coupled to said cable and linearly movable therewith, a linear selector scale graduating the linear path of movement of said selector pointer, a contact carried by said selector pointer and projecting into the path of said first pointer whereby a closed electrical circuit for actuating said alarm may be established, and means driving said cable upon the supporting pulleys whereby said selector pointer may be manually positioned at a selected indicator value at which the alarm is to be actuated.

8. In an indicator including a pointer movable over a graduated indicator dial, the improvement for actuating an indicator alarm comprising a plurality of spaced supporting means, a cable formed into a taut closed loop having two relatively linear leg portions and carried by said means, a selector pointer coupled to said cable and linearly movable therewith, a linear selector scale graduating the linear path of movement of said selector pointer, a contact carried by said selector pointer and projecting into the path of said first pointer whereby a closed electrical circuit for actuating said alarm may be established, and means driving said cable relative said supporting means whereby said selector pointer may be manually positioned at a selected indicator value at which the alarm is to be actuated.

References Cited in the file of this patent
UNITED STATES PATENTS

| 2,163,111 | Striemer et al. | June 20, 1939 |
| 2,169,268 | McCullough | Aug. 15, 1939 |
| 2,419,394 | Erhard | Apr. 22, 1947 |
| 2,484,038 | Kirlin | Oct. 11, 1949 |
| 2,728,072 | Magid | Dec. 20, 1955 |